(12) United States Patent
Patel et al.

(10) Patent No.: US 11,663,934 B2
(45) Date of Patent: May 30, 2023

(54) LED SIGN SYSTEM WITH REDUNDANT CONTROLLER

(71) Applicant: Ledstar Inc., Woodbridge (CA)

(72) Inventors: Milan Patel, Concord (CA); Andrey Burak, Toronto (CA); Bin Luo, Oakville (CA)

(73) Assignee: Ledstar Inc., Woodbridge (CA)

( * ) Notice: Subject to any disclaimer, the term of this patent is extended or adjusted under 35 U.S.C. 154(b) by 108 days.

(21) Appl. No.: 17/450,067

(22) Filed: Oct. 5, 2021

(65) Prior Publication Data

US 2022/0114925 A1    Apr. 14, 2022

Related U.S. Application Data

(60) Provisional application No. 63/089,165, filed on Oct. 8, 2020.

(51) Int. Cl.
| | |
|---|---|
| *G09F 9/33* | (2006.01) |
| *G09F 13/00* | (2006.01) |
| *G09F 13/22* | (2006.01) |
| *G09F 9/305* | (2006.01) |

(52) U.S. Cl.
CPC .............. *G09F 9/33* (2013.01); *G09F 13/005* (2013.01); *G09F 2009/3055* (2013.01); *G09F 2013/222* (2013.01)

(58) Field of Classification Search
CPC .. G09F 9/33; G09F 13/005; G09F 2009/3055; G09F 2013/222
See application file for complete search history.

(56) References Cited

U.S. PATENT DOCUMENTS

| | | | |
|---|---|---|---|
| 8,446,293 B2 | 5/2013 | Stadjuhar, Jr. et al. | |
| 2008/0104871 A1* | 5/2008 | Stadjuhar | G09F 7/00 40/584 |
| 2012/0319926 A1* | 12/2012 | Koebrich | G09G 3/14 345/1.3 |
| 2016/0162247 A1* | 6/2016 | Bryczkowski | G06F 11/3003 345/1.3 |
| 2017/0220429 A1* | 8/2017 | Stadjuhar, Jr. | G06F 11/202 |
| 2020/0183634 A1* | 6/2020 | Kruse | G08G 1/095 |

* cited by examiner

*Primary Examiner* — Gary C Hoge
(74) *Attorney, Agent, or Firm* — Orin Del Vecchio

(57) ABSTRACT

The present invention relates generally to an LED sign system use on roadways, and more particularly to a LED sign system for use on roadways with a redundant controller.

5 Claims, 3 Drawing Sheets

LED SIGN SYSTEM WITH REDUNDANT CONTROLLER

FIELD OF THE INVENTION

The present specification relates generally to an LED sign system use on roadways, and more particularly to a LED sign system for use on roadways with a redundant controller.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

LED signs have gradually replaced fixed painted signs on many roadways, particularly highways. LED signs provide improved visibility and greater flexibility than traditional painted signs.

A common risk is the failure of the sign controller which provides the display information to the LED sign or failure of the communication link between the sign controller and the LED signs. Therefore, as LED signs increase in usage, solutions are sought which reduce or mitigate these risks.

One such example is found in U.S. Published Patent Application No. US20200183634A1 of Daktronics Inc. This application describes a redundant system for an LED display which uses a redundant controller with a primary controller to provide a separate redundant communication loop. In the disclosed system either the primary controller or the redundant controller controls all of the LED displays.

Thus, while there are some attempts to reduce or mitigate LED sign failure known in the art, it remains desirable to have an LED sign system which provides alternative or improved risk mitigation for sign failure.

Accordingly, there remains a need for improvements in the art.

SUMMARY OF THE INVENTION

In accordance with an aspect of the invention, there is provided an LED sign system for use on roadways with a redundant controller to mitigate failure of any of the primary LED sign controllers.

According to an embodiment of the invention, there is provided an LED sign system, comprising: a plurality of LED signs, each LED sign coupled to a separate respective LED sign controller; a communication switch, the communication switch coupled to each of the respective LED sign controllers; and a redundant sign controller, the redundant sign controller coupled to the communication switch and to each of the respective LED sign controllers, and to a second communication switch, the second communication switch coupled to each of the LED signs via a separate connection from the respective LED sign controllers, wherein the redundant sign controller is operative to take over from any one of the respective LED sign controllers in event of an operational failure of any one of the respective LED sign controllers.

The redundant sign controller may be further operative to send an alarm signal upon taking over from one of the respective LED sign controllers. The operational failure comprises one or more of: a software failure, a hardware failure or a connection failure.

The redundant sign controller may apply a software algorithm to determine when to take over from one of the respective LED sign controllers. The software algorithm may be based on data packet monitoring between the LED signs and the respective LED sign controllers.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates generally to an LED sign system used on roadways, and more particularly to a LED sign system for use on roadways with a redundant LED sign controller.

Figure 1:
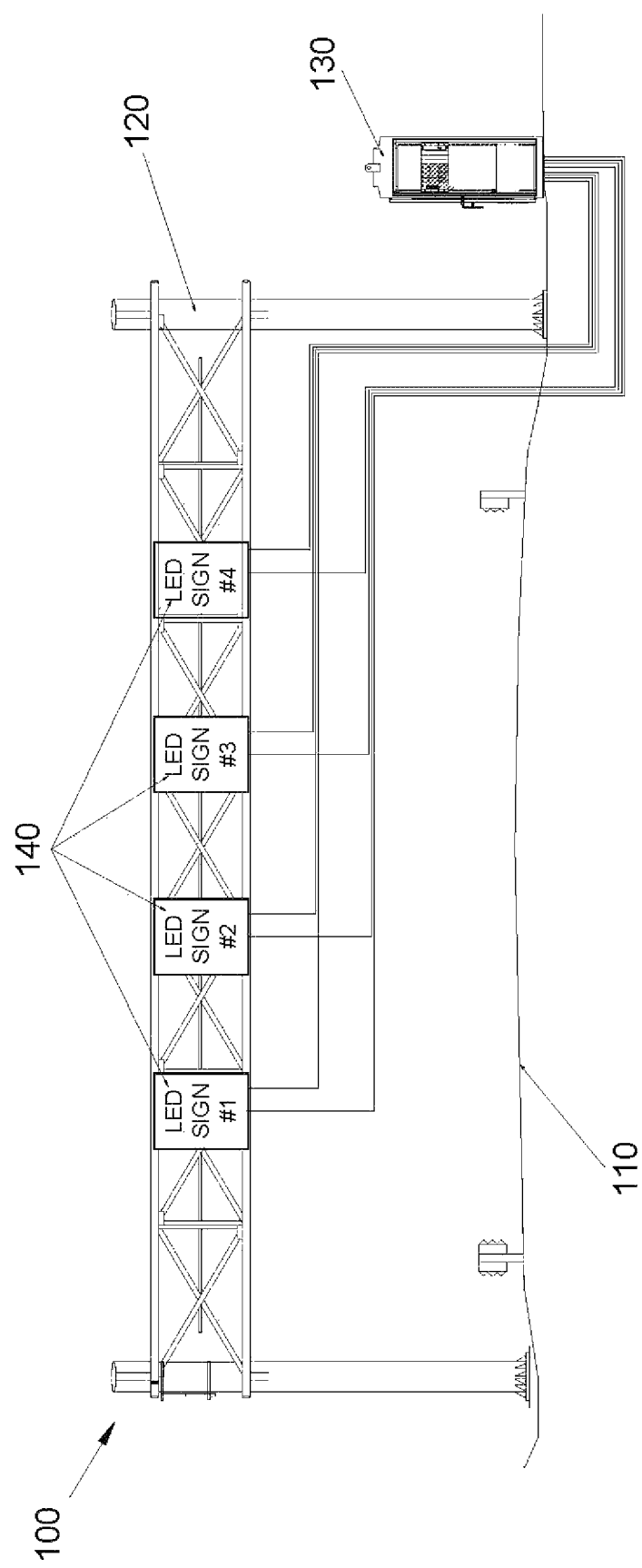
FIG. 1 is a schematic of an LED sign system.

As shown in FIG. 1, a typical LED sign system 100 comprises a roadway gantry 120 over a roadway 110, with one or more LED signs 140 connected to a control cabinet 130. The number of LED signs mounted on the gantry is generally dictated by the number of lanes in the roadway 110 (four, as shown) and the information to be displayed. Provided information may include traffic alerts, speed limits, lane closures, directional information, public service information (e.g. seat belt reminders), and/or advertising information. In most cases, failure of the LED sign and the corresponding failure to display information, presents a serious risk to motorists.

The LED signs 140 are typically made from a matrix of monochrome or multicolor light emitting diodes (LEDs) arranged in a matrix. The LEDs within the matrix are controlled via internal microprocessor logic which allows any desired text or graphic image to be rendered on the LED sign via the LEDs.

Figure 2:
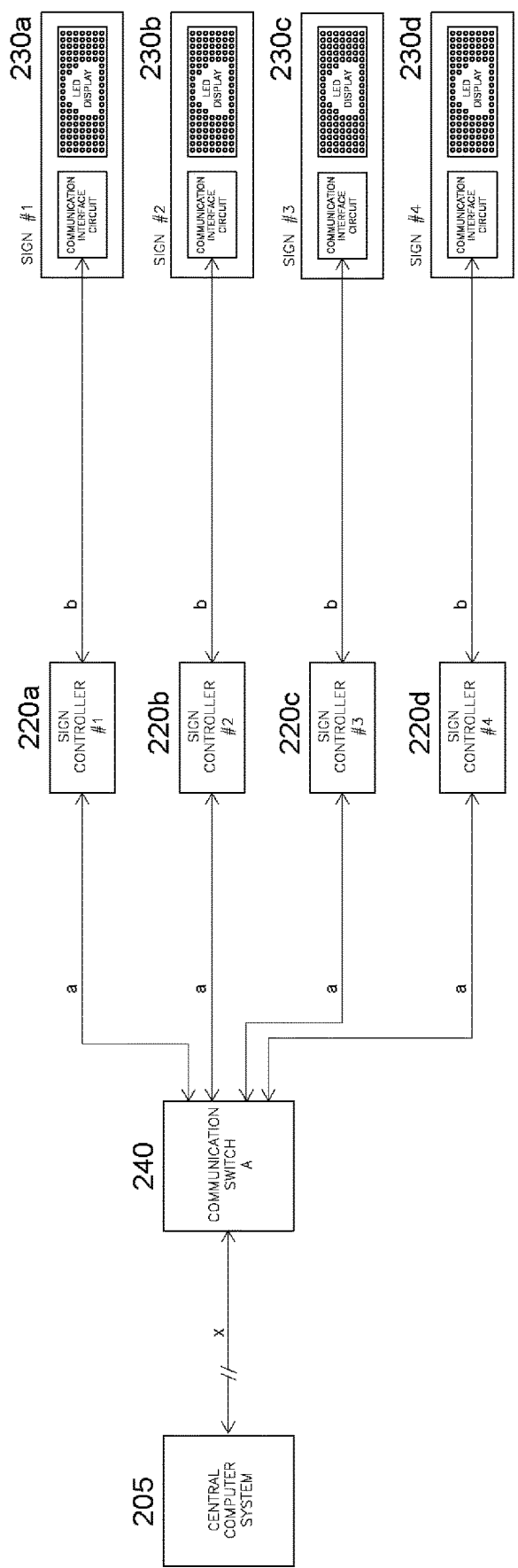
FIG. 2 is a block diagram of the LED sign system of FIG. 1.

A block diagram of a four-sign LED sign system is shown in FIG. 2. Each LED sign 230*a-d* is paired with a sign controller 220a-d, which communicates with the paired LED sign via a dedicated communication medium such as copper wiring or a fiber optic cable. Each sign controller is further connected to a communication switch 240 via a second communication medium, such as copper wiring or a fiber optic cable. The communication switch 240 receives commands form a central computer system 205 which provides display information for the LED signs 230a-d, which is translated by the sign controllers 220a-d to activate the corresponding LEDs to display the information. In this system, failure of any sign controller 220a-d will disable the paired LED sign 230a-d, without necessarily affecting the other LEDs signs.

Figure 3:
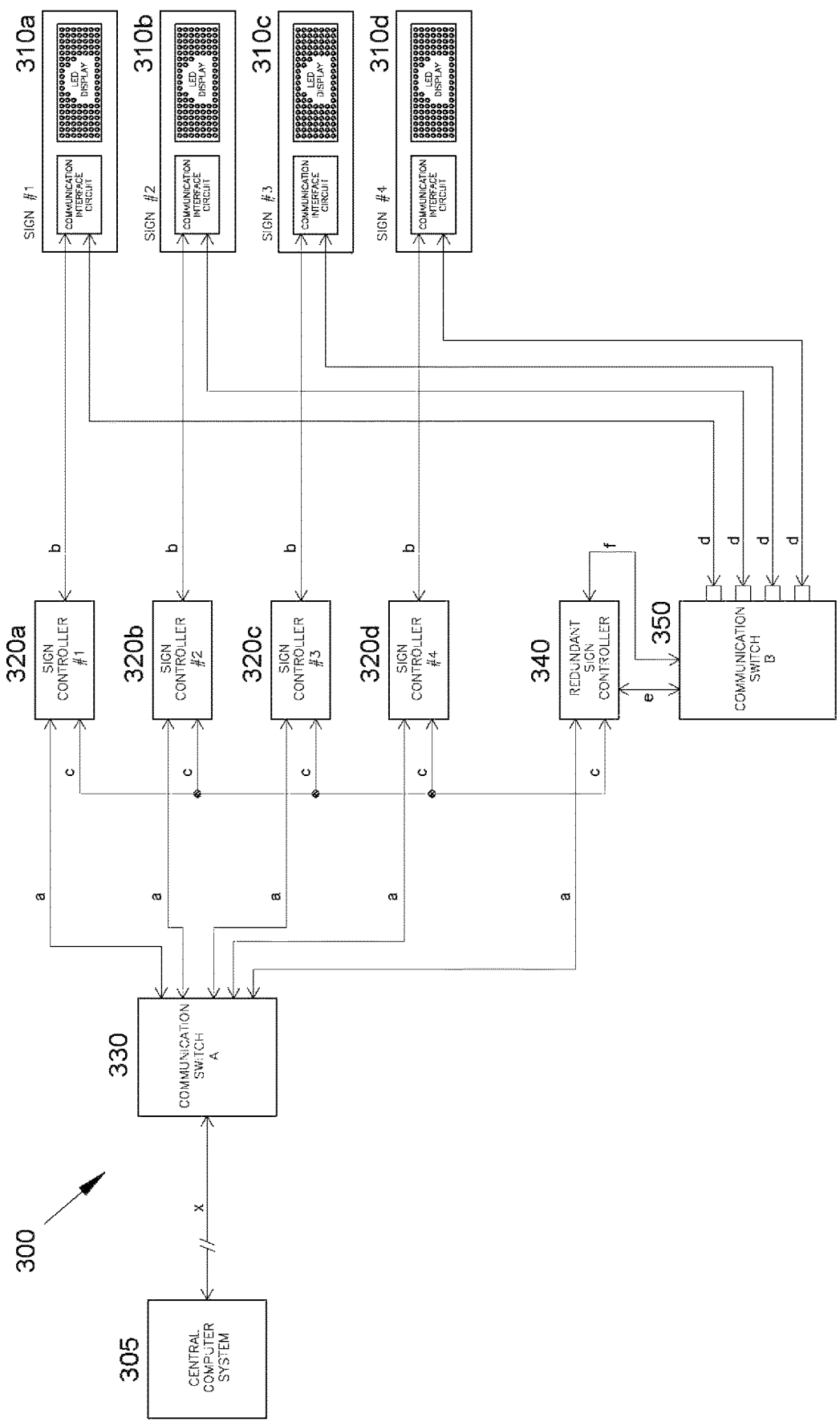
FIG. 3 is a block diagram of an LED sign system with a redundant controller according to an embodiment.

An embodiment of the present invention in shown in FIG. 3. A redundant LED sign system 300 is shown with four LED signs 310a-d. Each LED sign 310a-d is paired and connected to a respective primary sign controller 320a-d. Communication between the LED signs 310a-d and the primary sign controllers 320a-d takes place via a dedicated communication medium such as copper wiring or a fiber optic cable.

The primary sign controllers 320a-d are connected to a central communication switch 330 through a dedicated communication medium such as Ethernet wiring. The central communication switch 330 receives commands from a central computer system 305 which provides the display information (content) for each of the LED signs 310a-d. The central communication switch 330 then provides the display information to each primary sign controller 320a-d for translation and display on the respective LED signs 310a-d.

A redundant sign controller 340 is provided locally with the primary sign controllers and is coupled to each of primary sign controllers 320a-d via a communication bus. The redundant sign controller 340 is preferably identical to the primary sign controllers and is capable of performing the functions of any primary sign controller 320a-d. Redundant sign controller 340 further includes software that enables redundant sign controller 340 to monitor the operational fitness and status of each primary sign controller 320a-d. The redundant sign controller 340 is additionally connected to the central communication switch 330 and to a second communication switch 350. The second communication switch 350 is further connected to the LED signs 310a-d via a dedicated communication medium such as copper wiring or a fiber optic cable separate from the connections between the LED signs 310a-d and the primary sign controllers 320a-d.

The software monitoring may be provided as data packet monitoring, tracking successful data packet transmission data for of the primary sign controllers. Other monitoring parameters may be included, such as incrementing time of day. This data is continuously monitored and when invalid parameters are received, the corresponding primary sign controller 320a-d is deactivated and the redundant sign controller 340 takes over communication to the corresponding LED sign 310a-d.

Thus, when the redundant sign controller 340 detects an operational abnormality in any of primary sign controllers 320a-d, a signal is sent to the abnormal primary sign controller, disabling it. The redundant sign controller 340 then takes over the control of the corresponding LED sign 310a-d connected to the disabled controller. The redundant sign controller 340 then receives signals from the central communication switch 330 and accepts the commands destined for the abnormal primary sign controller. The redundant sign controller 340 then sends instructions to the corresponding LED sign 310a-d via second communication switch 350.

Similarly, if there is a failure in the primary physical communication connection between an LED sign 310a-d and respectively primary sign controller 320a-d, such as a break in the fiber optic cable, redundant sign controller 340 is still able to take over control of the LED sign, as the connection between LED signs 310a-d and second communication switch 350 represents a set of secondary physical connections (fiber optic or copper) separate from the primary physical connections to the primary sign controllers 320a-d.

Accordingly, if there is a software failure, hardware failure or communication failure with any of primary sign controllers 320a-d and LED signs 310a-d, redundant sign controller 340 is operative to seamlessly take over communication between the central communication switch 330 and the LED sign 310a-d that would otherwise be affected by the failure. Thus, the LED sign 310a-d may continue to operate normally even if there is a failure in the primary sign controller 320a-d, and the displayed information remains unchanged, reducing the risk of motorists being presented with erroneous or blank LED signs.

Furthermore, the system parameters of the primary sign controllers 320a-d and the redundant sign controller 340 and the communication connections to the LED signs 310a-d increase the overall fault tolerance of the system. As the connections in the system are structured in parallel, any failure or removal of an LED sign 310a-d from the system does not impact the operation of the other LED signs 310a-d, or the operation of the redundant sign controller 340.

Additionally, in the event where the redundant sign controller 340 takes over operation, it may also send an alert signal back to the central communication switch 330 indicating that a failure has taken place. This information may then be communicated back to the central computer system 305 to enable the assignment of maintenance personnel to resolve the issue which initiated the takeover event.

While the embodiment herein is described with respect to a four-sign LED display system, the system may function as described with any plurality of LED signs. Furthermore, while a single redundant sign controller is described, a second (or even more additional) redundant sign controller may be provided to provide redundancy for separate pluralities of LED signs, or additional redundancy for the system in general.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. An LED sign system, comprising:
    a plurality of LED signs, each LED sign coupled to a separate respective LED sign controller;
    a communication switch, the communication switch coupled to each of the respective LED sign controllers; and
    a redundant sign controller, the redundant sign controller coupled to the communication switch and to each of the respective LED sign controllers, and to a second communication switch, the second communication switch coupled to each of the LED signs via a separate connection from the respective LED sign controllers,
    wherein the redundant sign controller is operative to take over from any one of the respective LED sign controllers in event of an operational failure of any one of the respective LED sign controllers.

2. The LED sign system of claim 1, wherein the redundant sign controller is further operative to send an alarm signal upon taking over from one of the respective LED sign controllers.

3. The LED sign system of claim 1, wherein the redundant sign controller applies a software algorithm to determine when to take over from one of the respective LED sign controllers.

4. The LED sign system of claim 3, wherein the software algorithm is based on data packet monitoring between the LED signs and the respective LED sign controllers.

5. The LED sign system of claim 1, wherein the operational failure comprises one or more of: a software failure, a hardware failure and a connection failure.

* * * * *